Figure 1:
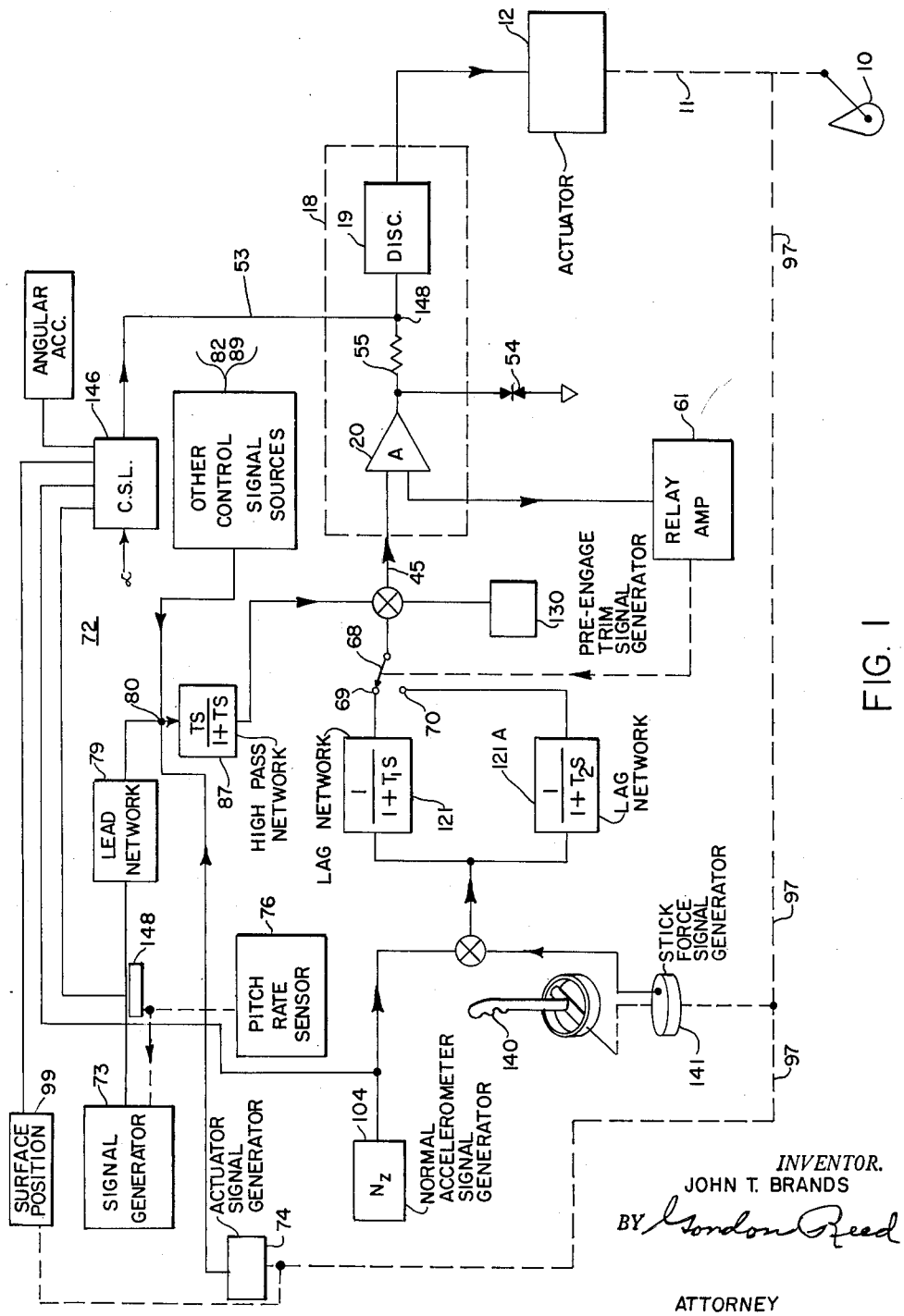

INVENTOR.
JOHN T. BRANDS
BY Gordon Reed
ATTORNEY

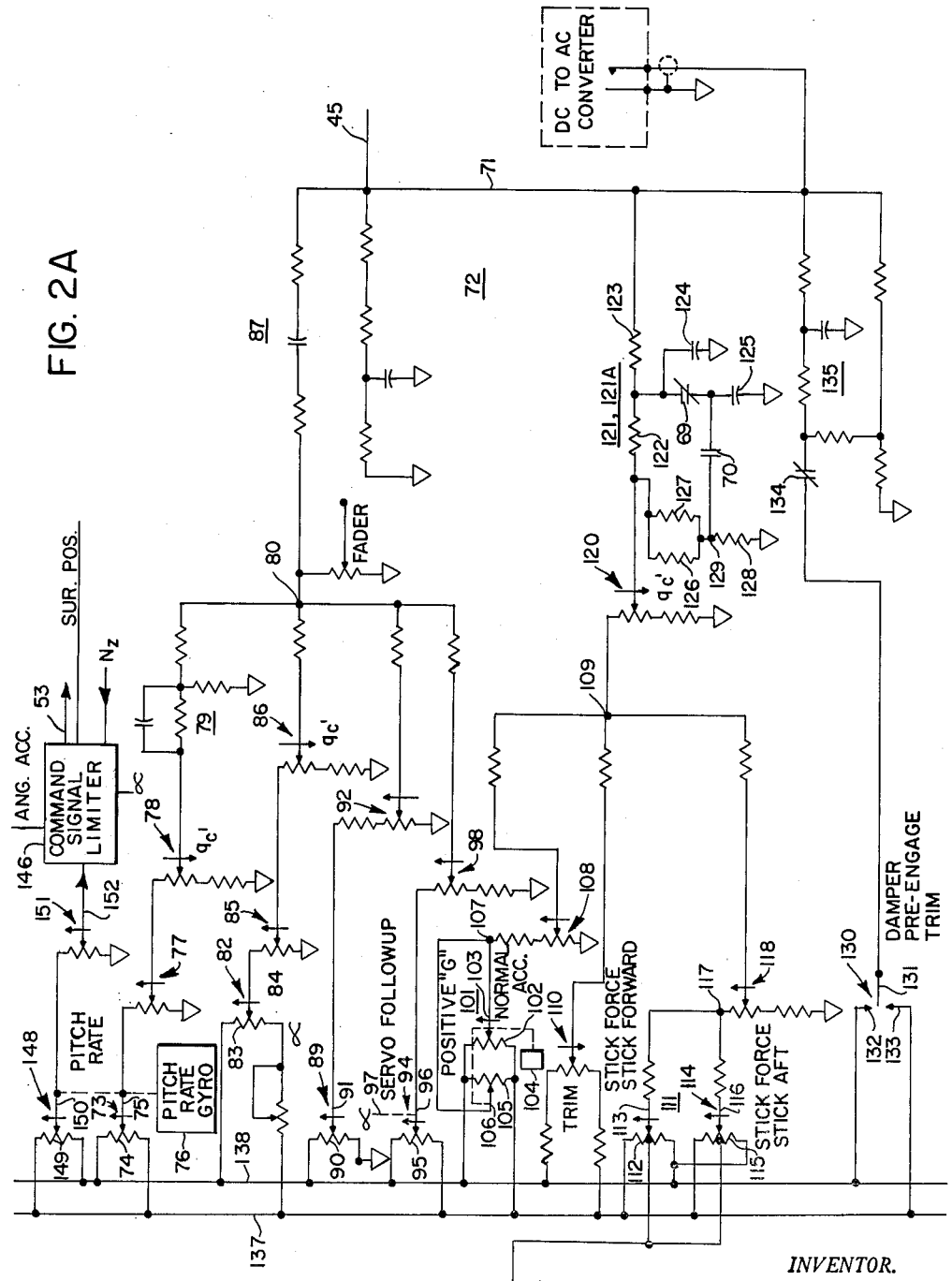

INVENTOR.
JOHN T. BRANDS
BY Gordon Reed
ATTORNEY

3,033,496
Patented May 8, 1962

3,033,496
CONTROL APPARATUS
John T. Brands, St. Paul, Minn., assignor to Minneapolis-Honeywell Regulator Company, Minneapolis, Minn., a corporation of Delaware
Filed Sept. 23, 1959, Ser. No. 841,783
19 Claims. (Cl. 244—77)

This invention relates to condition control apparatus and primarily to automatic condition control apparatus for maintaining or stabilizing a condition and with means for selectively varying the datum to which such condition is stabilized.

One type of automatic condition control apparatus to which the invention has been applied is an automatic flight control apparatus for an aircraft. Such control apparatus includes sensing devices for detecting changes in flight of the aircraft. Such detecting devices control attitude control means of the craft to return the aircraft to a desired flight condition.

Such apparatus includes manually operable control means which through the automatic control apparatus will change the flight condition to be stabilized. Such manual control may be derived directly from the conventional control stick of the aircraft through a resilient or elastic stick force transducer which permits relative movement of the control stick and the conventional aircraft cables that effect operation of the control surface to provide a control signal. This control signal operates the servo of the aircraft to position a control surface. To prevent the transmission of transient forces such as accidental bumping of the control stick being applied to the control system a lag device is placed between the pilot stick and control system.

In some instances, control signal voltages from the stick force transducer are introduced to the automatic control apparatus through a lag device such as a passive lag circuit having a time constant greater than that of the craft and comprising resistor-capacitor elements for example. In some instances, signal limiting means are provided to receive and limit such signals when in excess of that normally desired. Such a lag circuit in conjunction with a signal limiting device prevents the effect of sudden movement of the aircraft control stick from being immediately applied to the apparatus that controls the craft.

In some instances, signal limiting means are provided to receive and limit the maximum effective stick force signal in order that the aircraft in responding to such signal be not overstressed or attain an attitude in excess of that normally desired.

If the signal limiter be functioning, the pilot may be exerting a force on his control stick and thus to the transducer between the stick and cables to develop a fairly large control signal which is introduced, through the lag circuit and as modified by the limiter, to the automatic control apparatus. The pilot may be operating the stick force transducer to develop a large signal not realizing that the signal limiter is preventing application of the full transducer signal to the automatic flight control apparatus. Thus there is a build up of excessive signal in the lag circuit, which due to the limiter is not applied to the automatic control apparatus.

Upon reverse force application on the control stick, by the pilot, the pilot expects substantially immediate response of the aircraft to the reverse movement of the control stick. In other words, assuming control is to be about the craft pitch axis, if the initial displacement of the control stick controlled the elevator surface which introduced positive normal acceleration to the aircraft, the pilot expects reverse force on the control stick to result in negative normal acceleration both of which are along the Z axis of the aircraft. However, because of the accumulation of the initial signal in the lag circuit, reverse movement of the control stick does not result in the application to the automatic control apparatus within the normal time delay of the network of a signal of opposite character from that initially provided. This is somewhat disconcerting to the pilot and lessens his confidence in the automatic apparatus.

This lessening of confidence in the apparatus is especially true when the limiter takes the form of a command signal limiter of the type more fully disclosed in a prior application to Donald J. Rotier, Serial No. 772,316, filed November 6, 1958. Such limiting arrangement of the Rotier application when used in the pitch axis of an automatic pilot for an aircraft determines the incremental normal acceleration that may be tolerated by an aircraft during its flight. If a command signal from the manual control stick force transducer or from the sensing devices of the automatic control apparatus would introduce a normal acceleration in excess of that which the aircraft would safely tolerate, a command signal limiting control signal is substituted for the manual signal or sensor signal to control the elevator servomotor to avoid exceeding the acceleration the craft tolerates. In the event that manual command signal is being applied through the pilot stick, such signal will build up as stated through the lag device. When the pilot releases his control stick which is then automatically centered by the resiliency of the transducer, he expects a decrease in the normal acceleration of the craft due to decrease in the stick force signal or an opposite change of acceleration of the craft about its pitch axis from that arising from his force on the control stick. In the event that the manual signal, as decreased by the release of the stick, commands a lower incremental normal acceleration than the craft will tolerate, control of the servomotor of the automatic apparatus is returned to the manual stick force controller.

However, in some instances the residual signal in the lag device or lag network associated with the transducer is still of such phase or polarity as to call for an incremental acceleration in the direction in which the control stick was initially displaced. Thus the aircraft even with the signal limiter controlling the servomotor will undergo a change in pitch rate in the opposite direction than that which the pilot contemplates it would have upon his release of the control stick. Such action of the aircraft during flight, following the release of the control stick, is disturbing normally to the pilot of the aircraft.

It is an object therefore of this invention to obtain correspondence between the rate of an aircraft in flight and direction of pilot control stick force.

It is a further object of this invention to reduce the error between craft pitch rate or normal acceleration and pilot stick force.

A further object of this invention is to improve the tracking relationship between craft pitch rate and pilot stick force where such stick force provides a signal which controls the aircraft attitude rate and particularly where accelerations in achieving such rate is restricted below the full acceleration capabilities of the aircraft.

A further object of this invention is to improve the tracking or following relationship between craft normal acceleration and pilot stick force which through a resilient stick force transducer commands normal acceleration and wherein such control is introduced through a lag device with the effective craft acceleration control derived from the stick being limited to less than the maximum acceleration that the craft might attain from the control stick signal.

The above and further objects and advantages of the invention will be evident upon review of the following description made in conjunction with the subjoined drawings wherein:

FIGURE 1 is a block diagram of the invention applied to control an aircraft about its pitch axis.

Figure 2B:
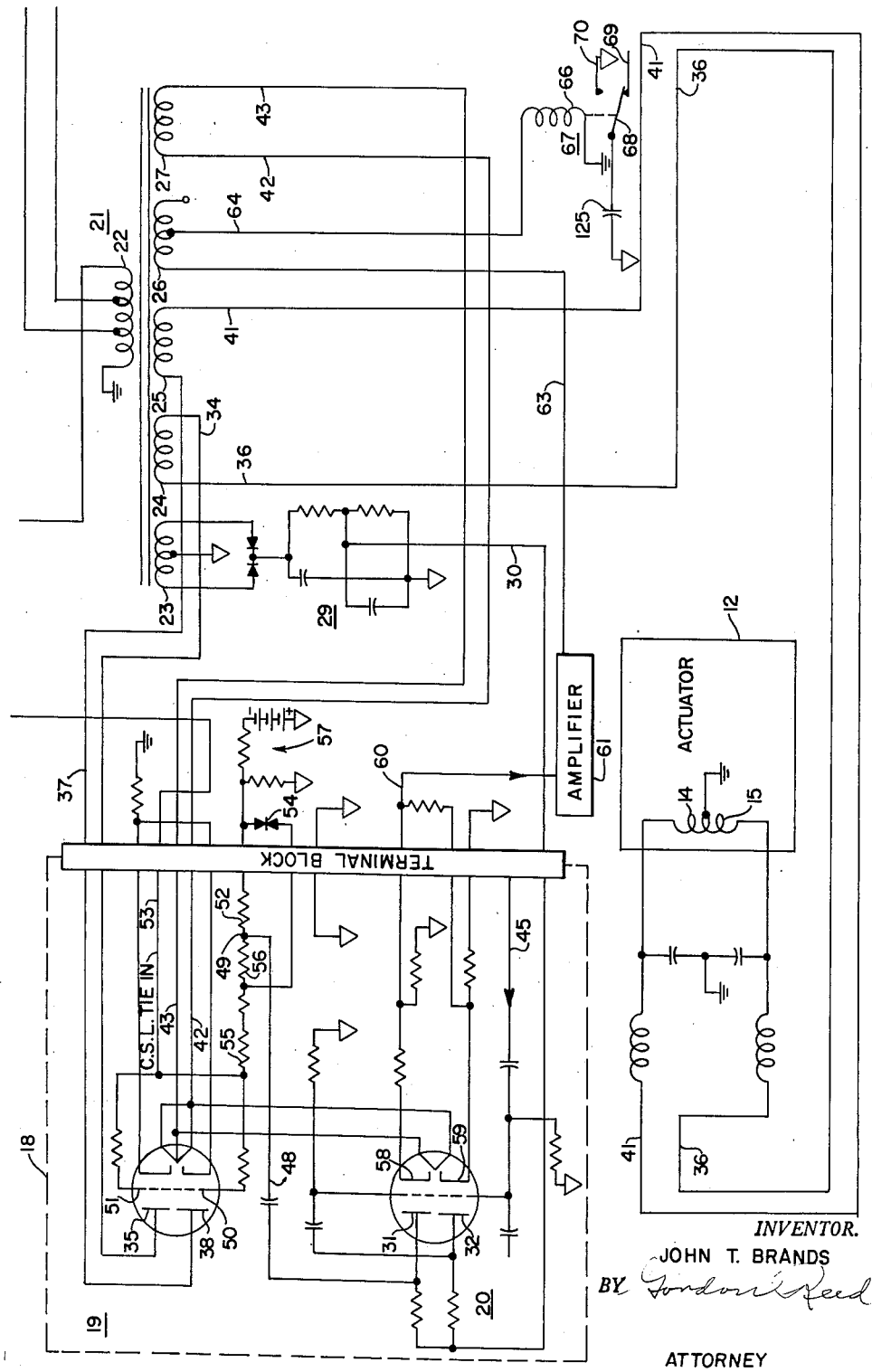

FIGURES 2A and 2B together comprise an electrical schematic of the invention applied to control the pitch attitude of an aircraft.

Referring to FIGURE 1, an elevator control surface 10 of an aircraft which serves for example to change attitude of an aircraft about the craft pitch axis is positioned by suitable operating means 11 extending from an actuator or servomotor means 12 on the aircraft. The actuator 12 constitutes part of an automatic craft attitude or craft position control apparatus and is operatively controlled from voltage amplifier-discriminator device 18. Input control voltage signals which are algebraically summed provide a resultant signal of positive or negative magnitude. This resultant voltage controls device 18 which in turn reversibly controls the operation of the actuator 12 and surface 10.

The control signals are derived from an auto-pilot electrical network or electrical bridge 72, having various conventional signal sources operated by sensing devices responsive to flight conditions of the aircraft such as attitude rate etc.

The signals from some signal sources in the autopilot network or bridge 72 are supplied through a lead network arrangement 79 to a summing point 80 and then by conductor 45 to the amplifier section 20 of amplifier-discriminator device 18. Additional signals proportional to the sum of craft normal acceleration along the Z axis of the craft or in the direction of its normally vertical axis and stick force are provided by an accelerometer arrangement 104 and stick force generator 141 through either of two lag networks 121, 121A but not both simultaneously to the amplifier-discriminator device 18. Transducer 141 through a potentiometer arrangement 111, FIGURE 2A, develops an additional signal which as stated is supplied through either of lag circuits 121, 121A to the amplifier-discriminator device 18. The lag circuits or networks bear the conventional symbols Ts, wherein T is the time constant and s is the derivative sign or jw.

The arrangement of FIGURE 1 additionally includes a command signal limiter 146 of the type described in an application of Donald J. Rotier, Serial No. 772,316 filed November 6, 1958. This command signal limiter arrangement 146 also receives control signals directly from the normal acceleration device 104, from the surface position device 99, and also like the autopilot bridge 72 receives a control signal from a pitch rate signal generator 148.

In such apparatus of FIGURE 1 and FIGURE 2A, when the pilot exerts a force on the control stick 140 he supplies a signal from transducer 141 and arrangement 111 which results through the control applied to the device 18 and actuator 12 an operation of surface 10 causing a change in pitch attitude of the craft. Such change in pitch attitude of the craft while in flight results in a normal acceleration along the craft Z axis sensed by the arrangement 104. When the magnitude of acceleration attained is such that, if exceeded the acceleration would adversely affect the structure of the aircraft or occupants thereof, the command signal limiter arrangement 146 which is responsive also to other flight signals of the aircraft prevents further increase in the control to be applied by transducer 141 to actuator 12 through the discriminator section 20 of amplifier-discriminator device 18 tending to increase normal acceleration or angle of attack above that existing.

In the event that the pilot during this time still exerts an increasing force on the control stick, this stick force signal will exceed the permissible transducer signal permitted by the command signal limiter. The continuing stick force signal results in an accumulation of a surplus or residual signal in the lag device 121 which at the moment does not control the craft and of which the pilot is not aware.

Should the pilot now move his control stick 140 in the opposite direction, or release the stick, the pilot assumes that the system comprising the command signal limiter arrangement 146 in response thereto or to decrease in the signal from transducer 141 may return the control of the amplifier discriminator 18 to the usual autopilot control including the autopilot bridge 72. However, if the residual signal as stated had remained in the lag arrangement 121 and was calling for normal acceleration in the direction corresponding to that in which the pilot stick 140 was initially displaced, the command signal limiter would retain control thereby causing a continued opposite change in attitude of the craft from that now desired by the pilot.

To obviate such condition, means including a relay amplifier 61 responsive to a resultant signal control voltage on the amplifier section 20 of the amplifier-discriminator device 18 are provided. This relay amplifier 61 operates a relay arm 68 to alter the time constant of the lag device 121 and in fact reducing the time constant to produce a second network 121A thereby rapidly dissipating or discharging the residual signal and preventing or reducing the tendency of the aircraft to change attitude in a direction opposite from that commanded by the pilot.

Referring to FIGURE 2B, with respect to details of the arrangement, and as in FIGURE 2A the symbol ∇ denotes control signal ground and symbol ≡ denotes power ground, servomotor means 12 which position the control surface or attitude changing means 10 through operating means 11 may be of the hydraulic type such as that disclosed in FIGURE 3b of a prior application of Corles M. Perkins, Serial No. 553,131, filed December 14, 1955. The servomotor 12 includes a control valve (not shown) operatively displaced by torque motor coils 14 and 15 herein corresponding with coils 336, 337 of the aforesaid Perkins application.

The amplifier-discriminator device 18 comprises a voltage phase discriminator section 19 and voltage amplifier section 20. The discriminator section comprises a double triode vacuum tube, and the voltage amplifier section 20 also comprises a double triode vacuum tube. The amplifier-discriminator device 18 receives its power from a transformer 21 having a primary winding 22 energized from an A.C. supply and a plurality of secondary windings 23, 24, 25, 26 and 27. Transformer winding 23 energizes a rectifier 29 which through conductor 30 supplies D.C. plate voltage to plates 31, 32 of amplifier section 20. Transformer winding 24 has one end connected through conductor 34 to an anode or plate 35 of discriminator section 19. The opposite end of transformer winding 24 is connected through conductor 36, torque motor coil 15, to ground. Transformer winding 25 has one end connected through conductor 37 to plate 38 of discriminator section 19 and has its opposite end connected through conductor 41 through torque motor coil 14 to ground. Transformer winding 26 is associated with a second amplifier 61 to be described. Transformer winding 27 is connected by conductors 42 and 43 for the purpose of energizing the heaters of vacuum tubes in the discriminator section 19, the voltage amplifier section 20, and the second amplifier 61. Input control signals are supplied to the grids of amplifier section 20 by a suitable conductor 45.

The output voltage of the amplifier section 20 is transmitted by a conductor 48 extending from plate 31 to a terminal 49 associated with a discriminator bias source 57. Between terminal 49 and the discriminator grid bias source 57 is a high resistance 52 which is shunted by a double ended zener diode arrangement 54 which limits the magnitude of the voltage from section 20 on conductor 48 that is opposed by the command signal limiter, and second resistor 56 in series. From the end of the second resistor remote from terminal 49 control signals are supplied to control grids 50, 51 of the discriminator section through a third resistor 55.

The voltage on discriminator section control grids 50, 51 is also supplied through a conductor 53 from a command signal limiter system as disclosed in the aforesaid Rotier application.

Additionally, connected into the circuit of cathodes 58, 59 of the amplifier section 20 is a conductor 60 which serves as an A.C. input to the second amplifier 61.

Amplifier 61 like device 18 is of the amplifier-discriminator type wherein the amplifier section receives its control voltage from conductor 60. Only one section of the discriminator section which corresponds generally to section 19 of amplifier-discriminator device 18 is utilized. This utilized portion of the discriminator has its output connected through a conductor 63 and transformer winding 26, conductor 64 to a winding 66 of a relay 67 for energization thereof, the relay having operable arm 68. This arm coacts with out contact 69 and in contact 70.

Returning to the signal input conductor 45 connected to the grids of amplifier section 20, its opposite end is connected to a terminal on a summing conductor 71 of a D.C. parallel voltage summing bridge network 72, FIGURE 2A.

Network 72 comprises a pitch rate signal generator 73, a linear angle of attack signal generator ($\alpha$) 82, a non linear angle of attack signal generator 89, a servo follow-up signal generator 94, a positive normal acceleration signal generator 101, a manually operable trim signal generator 110, a pilot stick force signal generator 111, and a damper pre-engage trim switch or signal generator 130. Signal generator 73 comprises a potentiometer having a resistor 74 and slider 75 which is positioned in accordance with the pitch rate of the craft by a pitch rate sensing device 76. Slider 75 is connected through a manually settable gain control potentiometer 77 and a second gain control device 78 varies in accordance with $qc'$ and through a rate control network 79 to a control signal summing point 80. Signal generator 82 comprises a potentiometer having a resistor 83 and slider 84 positioned relative thereto by an angle of attack ($\alpha$) sensing device (not shown). The resistor 83 is of the linear wound type so that its output is proportional to angle of attack. The slider 84 is connected through a gain control device 85 and a second gain control device 86 adjusted in accordance with $qc'$ to summing point 80. Signal generator 89 comprises a potentiometer having a resistor 90 and adjustable slider 91 operated in accordance with angle of attack of the craft. Signal generator 89 develops a non-linear angle of attack signal in accordance with the displacement of slider 91. Slider 91 is connected through a manually adjustable gain control potentiometer 92 to summing point 80 through a suitable summing resistor.

Signal generator 94 comprises a resistor 95 and adjustable slider 96 positioned by the servo driven actuating means 97 in accordance with servo operation. Slider 96 is connected through a gain control adjustment 98 and suitable summing resistor to summing point 80. Terminal 80 is connected through a suitable high pass passive network 87 to summing conductor 71. Only transient signals pass from terminal 80 to conductor 71 through network 87.

Signal generator 101 comprises a resistor 102 and adjustable slider 103 positioned in accordance with the normal acceleration of the craft along its Z axis by normal accelerometer 104. In parallel with resistor 102 is a potentiometer resistor 105 having adjustable sliders 103 and 106 selectively positioned by normal accelerometer 104. Sliders 103 and 106 are connected to terminal 107. Terminal 107 is connected through a gain control potentiometer 108 to a summing point 109. Trim signal generator 110 consists of a potentiometer resistor and manually adjustable slider which is connected through a summing resistor to terminal 109. Signal generator 111 comprises a pair of potentiometers. One potentiometer comprises an adjustable slider 113 and resistor 112 and the other potentiometer comprises a resistor 115 and adjustable slider 116. Sliders 113 and 116 are connected through suitable summing resistors to a summing point 117. Extending from summing point 117 is a voltage dividing potentiometer 118 which is connected through a suitable summing resistor to terminal 109. Terminal 109 is connected to a suitable gain control, in the form of a potentiometer 120 having its slider adjusted in accordance with $qc'$.

Potentiometer 120 is connected to summing conductor 71 through a lag network 121 of the type described and shown on page 113 of Servomechanism Analysis by Thaler and Brown, First Edition, 1953. Lag network 121 comprises two resistors 122 and 123 in series between potentiometer 120 and summing conductor 71. The lag network is completed from the terminal of resistors 122 and 123 which for this purpose is connected through normally closed contact 69 of relay 67 and capacitor 125 in series and through capacitor 124 in parallel to signal ground. The left end of resistor 122 is connected through resistors 126, 127 in parallel to terminal 129 at the upper end of resistor 128. Resistor 128 provides the voltage across condenser 125 when relay contact 70 is closed and relay contact 69 open. Lag network 121A under these conditions comprises resistors 122, 123 and capacitor 124 instead of the two capacitors 124 and 125 on original lag network 121 when contact 70 is open and contact 69 closed whereby the time constant of 121A is less than that of network 121. With 70 closed, the time constant of a network formed by capacitor 125, resistors 126, 127, 128 is about the same as that of network 121A, and the voltages across capacitors 124, 125 are the same. During command signal limiter control of the discriminator-amplifier device 18 and operation of relay 67, capacitor 125 applies no lag effect to conductor 71 as it is disassociated from the direct connection to the terminal between resistors 122, 123 and is connected to junction 129 and through parallel resistors 126, 127 and resistor 122 to said terminal permitting the charge on capacitor 125 to follow rapidly the voltage at the junction of resistors 122, 123 and thus the voltage on capacitor 124. This will provide smooth transition from lag circuit 121A back to 121 when relay in contact 70 opens and when contact 69 closes.

Bridge 72 additionally includes damper pre-engage signal generator 130 comprising an operable contactor 131 and opposed contacts 132, 133. Contactor 131 is operated by a pressure trim sensor corresponding with piston 49 of FIGURE 3b of the aforesaid Perkins application. The contactor 131 is connected through a normally closed relay contact 134 and quick charge-slow discharge circuit 135 to conductor 71.

Potentiometer resistors 74, 83, 90, 95, 102, 105, 112, 115 are connected across D.C. supply conductors 137, 138 connected to a suitable D.C. supply. Additionally the resistor of trim signal generator 110 is also connected across the supply conductors and contacts 132, 133 are respectively connected to conductors 138, 137.

As thus far described, but excluding relay contacts 69 and 70 and its associated lag circuits 121, 121A, the network 72 may be regarded as a pitch damper for damping the pitch action of the aircraft in flight along with the pilot stick control of signal generator 111 to command a desired normal acceleration. The pilot operates the signal generator 111 through suitable aircraft control stick 140 and control stick force transducer 141 comprising a resilient connection between the pilot stick and the servo or actuator operated follow-up means 97. The stick force transducer identified as resilient connection 141 FIGURE 1 may be similar to that disclosed in the aforesaid Perkins application and associated therein with the pilot operable control stick 72. Such transducers are old in the art and a similar type is illustrated in the patent to Klass 2,604,-

613. In this patent, a stick force signal generator 13 is arranged between the pilot operated stick 2 and the servo operated cables 8 and related mechanism 10, 11, 12, 7 associated therewith. The signal developed by signal generator 111 is proportional to the force applied by the pilot to the control stick 140.

The arrangement in FIGURES 1 and 2A includes a command signal limiter device 146. This command signal limiter device 146 receives various input control signals which when summed define the command signal limit function of the automatic apparatus. The sum of the signals of this limit function determine whether control of the discriminator section of amplifier-discriminator device 18 from the output of the amplifier section 20 will be limited.

One input to the command signal limiter device 146 is derived from a second pitch rate signal generator 148 comprising resistor 149 connected across energizing conductors 137, 138 and a slider 150 positioned in accordance with the pitch rate of the craft. Slider 150 is connected through a gain control potentiometer 151 and conductor 152 to the command signal limiter 146. Additional inputs to the command signal limiter 146 FIGURE 1 in accordance with various flight conditions of normal acceleration and stick force magnitude are supplied as shown in detail in the aforesaid Rotier application.

*Operation*

While the apparatus shown in FIGURES 2A and 2B will function as a damper to damp high frequency motions of the craft about its pitch axis this invention is primarily involved with the operation of the stick force transducers comprising signal generator 111, the normal accelerometer signal generator 101, and the command signal limiter 146.

When the pilot operates the control stick 140 to derive a stick force signal from signal generator 111, the control system including actuator 12 moves elevator 10 and the aircraft responds thereto by a resulting normal acceleration along its normally vertical or Z axis. If this normal acceleration attains a sufficient magnitude, the command signal limiter 146 will prevent any further increase in the magnitude of the output of the amplifier section 20 that controls the discriminator section 19 of the autopilot.

Assuming that the pilot still exerts an increasing stick force, the limiter 146 holds the normal acceleration at a level below that corresponding to that commanded by the actual stick force input by the pilot. Consequently an error voltage of stick force voltage minus normal accelerometer voltage develops at terminal 109 FIGURE 2A. This error signal applied to the lag network 121 causes a build up of a residual voltage in this lag circuit which voltage is in the direction or of a sense commanded by the initial stick force signal.

If the pilot stick 140 is now released to decrease the input to limiter 146, it may cause the command signal limiter 146 to permit a slight increase in the output of amplifier section 20 applied to the discriminator section 19. This additional signal would come from the lag circuit 121, and it would tend to impart further displacement of the elevator and an aircraft attitude change in a direction opposite to that expected from the pilot command due to the release of the pilot stick 142. In other words the residual signal in the lag network 121 if uncorrected gives the aircraft a pitching sensation opposite to that which the pilot wanted upon his relaxation of the control stick 142.

A corrective effect is provided however by the operation of relay amplifier 61 on energization of relay winding 66. Relay amplifier 61 preferably operates as follows, when the error signal voltage at terminal 109, FIGURE 2A, begins to increase indicating that the stick force signal from signal generator 111 exceeds the permissible output of normal accelerometer signal generator 101, this error voltage in effect is applied to amplifier 61 through conductor 60 extending from amplifier section 20, FIGURE 2B. When this voltage exceeds a predetermined value or magnitude, the current passes through a discriminator section of the amplifier 61 which is similar to discriminator 20 energizing the winding 66 of relay 67 causing the relay arm 68 to disengage contact 69 and engage contact 70 thereby to reduce the time constant T of lag network 121 to provide a second lag network 121A, FIGURE 1 and connect capacitor 125 to signal ground through contact 70 and resistor 128. The general form of the transfer function of a lag network is $$\frac{1}{1+Ts}$$

where T is the network time constant and $s$ is the Laplace operator denoting differentiation.

Briefly again under normal conditions of operation, the rate gyro operated autopilot bridge, the normal accelerometer, along with the stick force transducer control the aircraft about its pitch axis. The command signal limiter 146 is connected at terminal 148 to the right of resistor 55 of FIGURE 1. As the normal acceleration of the aircraft increases, the output of the command signal limiter 146 may build up opposing the voltage transmitted by discriminator input conductor 48 so that at terminal 148 no additional incremental control signal will be applied to the discriminator section 19 to cause further increase in the displacement of servo 12.

If the pilot has applied force to the control stick 140 and applies a force such that a signal from the stick force transducer 141 and signal generator 111 exceeds that from the normal accelerometer signal generator 101, the amplifier section 20 will energize the relay amplifier 61 as stated resulting in the operation of relay arm 68 to disengage contact 69 and engage contact 70 thereby reducing the time constant of the lag circuit 121. The time constant of the network 121A at this time is so small that with the subsequent removal of the stick force and return of the control stick to center to remove the signal on generator 111, the signal in the lag circuit 121A will be similarly reduced. Since the output of the normal accelerometer signal generators 101 is in excess of the stick force signal from generator 111, control of the discriminator returns to the amplifier section 20 so that the servo 12 will be operated to reduce the normal acceleration on the craft rather than increase it which condition obtains by holding the time constant of network 121 at a fixed value.

It will now be apparent that there has been provided novel apparatus for an automatic flight control apparatus comprising a combination of a normal acceleration command autopilot and a command signal limiter with the restrictive action of the command signal limiter being responsive to an aircraft acceleration due to a nose up command to an aircraft. Furthermore by amplifying and rectifying the voltage on conductor 60 and controlling relay 67 therefrom the apparatus functions for downward accelerations. As a consequence, there has been provided a control whereby the aircraft follows more closely the operation of a manual input wherein such manual input may be derived from the operation of the conventional pilot stick of the aircraft.

While the arrangement of the invention has been described as applied to a pitch axis control of an aircraft it will be understood that corresponding systems could be normally employed for control of the roll or turn motions of the aircraft where the roll motion is taken relative to the Y axis and the turn motion relative to the Z axis of the aircraft.

What is claimed is:

1. In control apparatus for an aircraft having attitude changing means, in combination: a servo means operat-said attitude changing means; a displaceable manual controller; a control signal source operated by said controller upon a first displacement thereof; a resistor-capacitor lag circuit interconnecting said signal source and servo means; a signal limiter responsive to a predetermined condition of said aircraft due to operation of said manual controller including means preventing further controlling said servo means from said lag circuit and controller upon said displacement of said controller thereby preventing increase in said condition; and further means reducing the time constant of said lag circuit during said predetermined condition to permit more rapid discharge thereof so that substantially an immediate response of the craft results upon opposite displacement of said controller tending to decrease said predetermined condition.

2. The apparatus of claim 1, means responsive to a derived function of the attitude of the craft for supplying a second control signal; and means for combining said second signal with that from the control signal source.

3. In apparatus having condition changing means, in combination: a displaceable manual controller; first means providing a signal and operated by said controller; a servo means operating said condition changing means; a lag device interconnecting said first means and servo means; a limiter responsive to a second condition related to the condition being maintained and resulting from operation of said manual controller; means including said limiter controlling said servo means upon obtainment of a predetermined magnitude of the second condition during said controller displacement thereby preventing increase in said second condition; and further means reducing the time constant of said lag device during said predetermined magnitude of said second condition to permit more rapid dissipation of the signal stored therein so that substantially immediate response of a servo means to reduce said second condition from said predetermined magnitude occurs upon opposite displacement of said controller.

4. In flight control apparatus for an aircraft having attitude changing means, in combination: servo means operating said attitude changing means; a first control signal providing means; a second control signal providing means responsive to a flight condition of said craft; a lag device interconnecting said first and second signal providing means to said servo means to prevent the sudden transmission of step input form signals thereto; auxiliary control means preventing further controlling of said servo means by said first and second signals tending to increase the condition upon said craft obtaining a maximum desired flight condition level defined by an aircraft structural limit function; additional means responsive to the obtainment of said maximum flight condition defined by said limit function of said craft altering the normal discharge path of said lag device and effecting more rapid discharge therefrom of said signals whereby upon decrease of said first control signal a substantially immediate response of the craft away from said maximum condition occurs.

5. The apparatus of claim 1, follow-up means developing a signal in accordance with the operation of said servo means; and means for additionally controlling said servo means from said follow-up signal.

6. The apparatus of claim 5 wherein said follow-up means includes a follow-up control signal source operated in accordance with the displacement of said servo means and means for transmitting such displacement signal to control said servo means.

7. In condition control apparatus having condition changing means, in combination: a servo means operating said condition changing means; a displaceable controller providing a first electrical voltage signal; a resistor-capacitor type lag network wherein the output has a phase displacement relative to the input and interconnecting said controller and servo means to effect operation thereof in one direction; means preventing further operation of said servo means by said controller in said one direction; further means reducing the time constant of said lag network while such further operation is prevented whereby the output voltage therefrom is substantially in phase with the input voltage, so that upon opposite displacement of said controller substantially immediate operation of said servo means in the opposite direction occurs.

8. In control apparatus for an aircraft having attitude changing means, in combination; a servo means operating said attitude changing means; a displaceable controller providing a first electrical signal; a resistor-capacitor type lag network, having the output related to the input by the expression or transfer function $$\frac{1}{1+Ts}$$

where T is the network time constant and $s$ the Laplace operator, interconnecting said controller and servo means to effect operation thereof in one direction; means responsive to a flight condition of said craft resulting from operation of said attitude changing means preventing further operation of said servo means by said controller in said one direction; means to reduce the time constant T of said lag network while such further operation is prevented during displacement of said controller to reduce the charging time thereof so that the output electrical signal voltage therefrom upon opposite displacement of said controller conforms to the input voltage causing substantially immediate operation of said servo means in the opposite direction.

9. Control apparatus for an aircraft having attitude changing means, in combination: a servo means operating attitude changing means; a displaceable controller providing a first electrical signal; a lag device, having a time contant that relates the output to the input of the device, interconnecting said controller and servo means to effect delayed operation of said servo means relative to operation of said controller in one direction; means providing a second signal in accordance with the changes of displacement of said servo means and controlling said servo means; means preventing further operation of said servo means by said controller in said one direction; additional means to reduce the time constant of said lag device while such further operation is prevented so that upon opposite displacement of said controller substantially immediate operation of said servo means in the opposite direction occurs; and means in said additional means for restoring the original time constant to said lag device during opposite operation of said servo means.

10. In control apparatus for an aircraft having pitch attitude changing means, in combination: a servo means operating said attitude changing means; a displaceable controller providing a first electrical signal; a resistor-capacitor lag circuit having its input connected to said controller and output connected to said servo means to effect operation thereof in one direction, said lag circuit having a time constant T which relates the output to the input; a second signal providing means connected to the input of the lag circuit and responsive to a flight condition of said aircraft; means preventing further operation of said servo means in said direction by said controller; means to reduce the time constant of said lag circuit while such further operation is prevented so that upon reverse displacement of said controller said second signal effects substantially immediate operation of said servo means in the opposite direction.

11. In control apparatus for an aircraft having attitude changing means, in combination: operable means in accordance with which said attitude changing means may be displaced; a displaceable controller which when displaced in one direction provides a first electrical signal; a resistor-capacitor lag circuit having an input section and output section and having its input section connected to said controller and output section connected to said operable means to effect operation thereof in one direction; a second signal providing means connected to the input of the lag circuit in opposition to said first signal and responsive to a flight condition of said aircraft caused by operation of the attitude changing means; means preventing further operation of said operable means by said controller while it is further displaced in said direction thereby preventing further increase in said second signal when the attitude changing means is displaced in accordance with said operable means while said first signal may increase; means to reduce the time constant of said lag network while such further operation of said operable means by said first signal is prevented, so that upon removal of the displacement of said controller, said second signal effects substantially immediate operation of said operable means in the opposite direction.

12. The apparatus of claim 11 wherein the means to reduce the time constant of said network is responsive simultaneously with the termination of displacement of said operable means.

13. In control apparatus for an aircraft having attitude changing means, in combination: a servo means operating said attitude changing means; a displaceable controller moveable in one direction and providing a first signal; a resistor-capacitor lag circuit having a time constant T that relates the output to the input of the lag circuit, said circuit having an input section connected to said controller and an output section connected to said servo means to effect operation thereof in one direction; a second signal providing means responsive to normal acceleration of the craft connected to the input of the lag circuit in opposition to the first signal; command signal limiter means responsive to said second signal and effective when the second signal reaches a set level preventing further operation of said servo means by said controller while displaced in said direction tending to exceed the level of said limiter; means reducing the time constant of said circuit while said command signal limiter is operative, so that upon opposite displacement of said controller substantially immediate operation of said servo means in the opposite direction due to the preponderance of said second signal occurs.

14. The apparatus of claim 13, and further means driven by the servo means and providing a signal during operation of said servo means for additionally controlling said servo means.

15. An apparatus for controlling a condition of flight of an aircraft having condition changing means, in combination: a first source of signal voltage; motor means operating said condition changing means; voltage responsive means, including a lag device having a time lag between its output and input interconnecting said source of signal and said motor means; means responsive to a second condition of flight caused by response of the craft to operation of said condition changing means terminating operation of said motor means by said first source of signal; and means responsive to continuation of the signal from the first source reducing the time constant of the lag device to effect rapid dissipation of the voltage stored therein so that upon decrease of said first signal the attitude changing means may be displaced in the opposite direction with minimum delay.

16. An apparatus for controlling attitude of an aircraft having attitude changing means, in combination: a first source of control signal voltage; a passive lag device having an input section and an output section and having a time constant that relates the time phase displacement of the output to the input, said lag device having a time constant greater than the aircraft; means connecting the first source of voltage to the input section; positionable means displaceable from a normal position; further means connecting said output section to the positionable means; a normal accelerometer voltage signal generator sensing craft accelerations resulting when the attitude changing means are operated in accordance with the displacement of the positionable means; means responsive to the signal from the normal accelerometer signal generator terminating further increase in displacement of said positionable means; and additional means connected to said input section reducing the time constant of said lag device to effect rapid dissipation of any signal stored therein, such as that arising from continued development of a signal by said first source.

17. An apparatus by which attitude of an aircraft having attitude changing means may be controlled, in combination: an aircraft control stick operated stick force signal generator; aircraft normal acceleration responsive signal generator; means combining said two signals in opposition to obtain a resultant signal; a resistor-capacitive lag device having an input section and output section and having a time constant that relates the time phase displacement of the output to the input, the input section being energized from the resultant signal and the output section operating a positionable device so that normal acceleration of the craft results when the attitude changing means are operated in accordance with the position of said positionable device; means responsive to said normal accelerometer signal generator and effective upon a predetermined magnitude of said generator signal, terminating any increase in displacement of said positionable device from a normal position; and further means responsive to said resultant signal altering the time constant of said lag device, to effect rapid dissipation of any signal stored therein, such as that arising from continued displacement of said control stick developing a signal in excess of the normal accelerometer signal.

18. In control apparatus for an aircraft having attitude changing means, in combination: a servomotor operating said attitude changing means; an amplifier controlling said servomotor; a manual controller including a control signal source developing a signal in accordance with the force applied to said controller; a resistor-capacitor lag circuit interconnecting said signal source and amplifier; a signal limiter responsive to a predetermined flight condition of said craft including means preventing further controlling said amplifier from said lag circuit and manual controller upon continued application of force to said controller, thereby preventing increase in said predetermined condition; follow-up means responsive to a second flight condition of said craft opposing said manual developed signal in said lag circuit; relay means responsive to a predetermined difference of said manual developed signal and said second flight condition signal and connected to said lag circuit for reducing the time constant thereof when said manual controller is prevented from further controlling said amplifier to permit more rapid discharge of said lag circuit so that substantially an immediate response of the craft attitude results upon reduction in magnitude of the force applied to said manual controller.

19. The apparatus of claim 18 wherein the relay requires a larger voltage to pull in than to drop out, whereby the small difference voltage required to hold in said relay permits the lag circuit time constant to remain reduced below the difference required to pull in the relay upon release of the manual controller and the output of the lag device conforms substantially to a decreasing step function.

No references cited.